United States Patent
Janakiraman et al.

(10) Patent No.: US 9,647,970 B2
(45) Date of Patent: May 9, 2017

(54) SORTING ELECTRONIC MAIL

(71) Applicant: International Business Machines Corporation, Armonk, NY (US)

(72) Inventors: Janani Janakiraman, Austin, TX (US); Dany R. Madden, Beaverton, OR (US); Meenakshi Sripal, Saint Louis, MO (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/312,791

(22) Filed: Jun. 24, 2014

(65) Prior Publication Data

US 2015/0372955 A1 Dec. 24, 2015

(51) Int. Cl.
G06F 17/30 (2006.01)
H04L 12/58 (2006.01)
G06F 17/21 (2006.01)
G06F 17/27 (2006.01)

(52) U.S. Cl.
CPC .......... *H04L 51/12* (2013.01); *G06F 17/21* (2013.01); *G06F 17/2775* (2013.01); *H04L 51/14* (2013.01)

(58) Field of Classification Search
CPC .... G06F 17/30; G06F 17/21; G06F 17/30106; G06F 17/2775; G06Q 10/107; H04L 51/12
USPC .......................... 715/234, 254; 707/748, 731
See application file for complete search history.

(56) References Cited

U.S. PATENT DOCUMENTS

| | | | |
|---|---|---|---|
| 7,805,676 B2 * | 9/2010 | Schemers | G06Q 10/109 715/711 |
| 8,635,288 B2 | 1/2014 | Yigang et al. | |
| 2009/0100347 A1 * | 4/2009 | Schemers | G06Q 10/109 715/751 |
| 2013/0143533 A1 | 6/2013 | Carlson et al. | |
| 2013/0268839 A1 * | 10/2013 | Lefebvre | G06Q 10/107 715/234 |

(Continued)

FOREIGN PATENT DOCUMENTS

| | | |
|---|---|---|
| WO | 2005098600 A2 | 10/2005 |
| WO | 2014000131 A1 | 1/2014 |

OTHER PUBLICATIONS

Unknown, "Is there a trick to automatically delete semantically expired e-mails?", Superuser.com, Posted: Dec. 8, 2010, © 2014 stack exchange inc., (accessed: Aug. 11, 2013, printed: Apr. 30, 2014). http://superuser.com/questions/219775/is-there-a-trick-to-automatically-delete-semantically-expired-e-mails.

(Continued)

*Primary Examiner* — Vincent Boccio
(74) *Attorney, Agent, or Firm* — Mark G. Edwards (57) ABSTRACT

Emails are received and parsed for a set of dates. A set of words surrounding the set of dates are identified and contextual information is correlated with the set of dates based on the set of words. It is then determined whether the dates are promotional expiration dates based on the contextual information. The emails that have promotional dates are placed in a list having a chronological order that is based on the promotional expiration dates. The current calendar date is checked and emails are excluded from the list in response to the current calendar date being chronologically after the promotional expiration date. The list is then displayed based on the exclusion of the email.

18 Claims, 9 Drawing Sheets

(56) References Cited

U.S. PATENT DOCUMENTS

2014/0129942 A1* 5/2014 Rathod ............ H04N 21/44222
                                                                715/720

OTHER PUBLICATIONS

Laclavik et al., "Email Analysis and Information Extraction for Enterprise Benefit", Computing and Informatics, vol. 30, 2011, pp. 57-87, Manuscript received: Oct. 22, 2010. http://www.cai.sk/ojs/index.php/cai/article/viewFile/154/130.

Mell et al., "The NIST Definition of Cloud Computing", Recommendations of the National Institute of Standards and Technology, NIST Special Publication 800-145, Sep. 2011, 7 pages, US Department of Commerce, Gaithersburg, MD.

Park et al., "Automatic E-mail Classification Using Dynamic Category Hierarchy and Semantic Features", IETE Technical Review, Nov.-Dec. 2010, pp. 478-492, vol. 27, Issue 6, Copyright © 2010 by the IETE DOI: 10.4103/0256-4602.67153; Paper No. TR 338_09.

Pinola, M., "Automatically Clean Up Gmail on a Schedule with This Script", lifehacker.com, Feb. 22, 2013, (accessed Aug. 11, 2013, printed: Apr. 30, 2014). http://lifehacker.com/5986204/automatically-clean-up-gmail-on-a-schedule-with-this-script.

Waldow, DJ., "No, Gmail's Promotions Tab Didn't Just Kill Email Marketing", Entrepreneur.com, Aug. 2, 2013, Article 227668, Copyright © 2014 Entrepreneur Media, Inc., (accessed: Aug. 11, 2013, printed: Apr. 30, 2014). http://www.entrepreneur.com/article/227668.

Welzl et al., "The Expires Header in Email", Internet-Draft, Proposed Standard, Jul. 30, 2008, © The IETF Trust 2008. http://tools.ietf.org/html/draft-welzl-expires-00.

\* cited by examiner

EMAIL 302
from: Local Restaurant <localrestaurant@mail.net>
to: Customer 1 <customer1@mail.com>
date: Thu, May 29, 2014 at 3:05 PM
subject: Meal Deals!

$10 off your next meal until 07/01/14! (limit one per customer)

EMAIL 304
from: Local Store <localstore@mail.net>
to: Customer 1 <customer1@mail.com>
date: Sun, May 25, 2014 at 1:29 PM
subject: All kitchenware on sale!

20% off all kitchenware! Sale ends June 16th

EMAIL 306
from: Local Theatre <localtheatre@mail.net>
to: Customer 1 <customer1@mail.com>
date: Thu, May 15, 2014 at 8:14 PM
subject: Opening weekend deal Free popcorn for all movie goers this weekend, May 17th – May 18th!

EMAIL 308
from: Grandma <grandma@mail.com>
to: Customer 1 <customer1@mail.com>
date: Wed, May 28, 2014 at 10:23 AM
subject: weekend visit

What time will you arrive this weekend?

Grandma

EMAIL 310
from: Moonlight Marathon <Moonlightmarathon@mail.net>
to: Customer 1 <customer1@mail.com>
date: Mon, May 26, 2014 at 11:10 AM
subject: Upcoming Event!

Come run in the Moonlight Marathon Saturday, August 2nd! Must register by July 28th to compete.

SORTING ELECTRONIC MAIL

BACKGROUND

The present disclosure relates to sorting electronic mail (email), and more specifically, to sorting promotional emails based on the expiration of their promotion.

Email is a method of exchanging digital messages from an author to one or more recipients. Email can be sent using the Internet or other computer networks. Emails can be ordered in many different ways, such as dates received, authors of emails, and level of importance. Furthermore, email applications give users large amounts of storage space for email. This has caused users to leave emails in the email application that are old and no longer useful or irrelevant. Promotions can include attempts to incentivize consumers, wholesalers, retailers, or other organizational customers to stimulate immediate sales. Promotions can be used to attract new customers, to hold present customers, to counteract competition, and to take advantage of opportunities that are revealed by market research. Examples of promotions sent using email can at least include, but are not limited to, coupons, samples, contests, rebates, and sweepstakes.

SUMMARY

According to embodiments of the present disclosure, a method is disclosed for sorting promotional electronic mail (email). In various embodiments, the method may include receiving a set of emails and parsing through emails from the set of emails for a set of dates. The method may further include identifying a set of words surrounding the set of dates and correlating contextual information with the set of dates based on the set of words. In addition, the method may include determining that at least some of the dates are promotional expiration dates based on the contextual information. Also, the method may include placing a subset of emails from the set of emails that have the promotional expiration dates, in a list having a chronological order that is based on the promotional expiration dates and checking a current calendar date. Furthermore, the method may include excluding an email from the list in response to the current calendar date being chronologically after the promotional expiration date and displaying the list based on the exclusion of the email.

According to embodiments of the present disclosure, a system is disclosed for sorting promotional electronic mail (email). In various embodiments, the system may include a promotional email sorter configured to receive a set of emails and parse through emails from the set of emails for a set of dates. The promotional email sorter may be further configured to identify a set of words surrounding the set of dates and correlate contextual information with the set of dates based on the set of words. In addition, the promotional email sorter may be further configured to determine that at least some of the dates are promotional expiration dates based on the contextual information. Also, the promotional email sorter may be configured to place a subset of emails from the set of emails that have the promotional expiration dates, in a list having a chronological order that is based on the promotional expiration dates. Furthermore, the promotional email sorter may be configured to check a current calendar date and exclude an email from the list in response to the current calendar date being chronologically after the promotional expiration date. In addition, the system may include a display device configured to displaying the list based on the exclusion of the email.

According to embodiments of the present disclosure, a computer program product is disclosed, configured to sort promotional electronic mail (email). In various embodiments, the computer program product may be configured to receive a set of emails and parse through emails from the set of emails for a set of dates. The computer program product may be further configured to identify a set of words surrounding the set of dates and correlate contextual information with the set of dates based on the set of words. Also, the computer program product may be further configured to determine that at least some of the dates are promotional expiration dates based on the contextual information. In addition, the computer program product may be further configured to place a subset of emails from the set of emails that have the promotional expiration dates, in a list having a chronological order that is based on the promotional expiration dates and check a current calendar date. Furthermore, the computer program product may be configured to exclude an email from the list in response to the current calendar date being chronologically after the promotional expiration date and display the list based on the exclusion of the email.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to sorting electronic mail (email), more particular aspects relate to sorting promotional emails based on the expiration of their promotion. While the present disclosure is not necessarily limited to such applications, various aspects of the disclosure may be appreciated through a discussion of various examples using this context.

Various embodiments of the present disclosure are directed toward a system that is configured to list emails according to the expiration date of a promotion and get rid of promotional emails that have expired or have become invalid. The system can be configured to use computer networks to exchange digital messages (e.g., email) from an author to one or more recipients. The content of the emails can be parsed for calendar dates and the meaning of the calendar dates can be determined by reviewing the words surrounding the date and understanding why the date is given. For instance, the word 'sent' can appear next to the date 05/28/14 in an email. Therefore, it can be understood that the email was electronically dispatched on May 28, 2014. The dates that are determined to be expiration dates of promotions or promotional events can be collected and the emails sorted based on the most recent expiration. Furthermore, an email that has an expiration date that has passed can be excluded from the email list and the list can be presented to a user.

An individual email message can be opened and the contents of the email can be revealed. The content can be divided into two categories: the header and the body. The header can include information about the email such as, the author, the recipient, the subject, and the date sent. The body can include basic information similar to a written letter and for a promotional email, the promotion. In particular embodiments, the content can be searched to identify the dates within an email. For instance, within an individual email, three dates may be identified, one in the header and two in the body.

Consistent with particular embodiments, when the dates have been found, the system can examine the words around the dates to establish the meaning of each date. For example, similar to the above example, the word 'sent' is next to the date in the header. For the first date found in the body, the date is preceded by 'Sale begins' and the second date in the body is preceded by 'Sale ends'. In certain embodiments, the system may retrieve the date or dates that are determined to be the expiration dates of the promotion. Therefore, in this example, because the words 'Sale ends' precedes the second date in the body, it is determined that it is the expiration date of the promotion. Furthermore, because 'sent' and 'Sale begins' precedes the other two dates, they are determined not to be expiration dates of the promotion.

Embodiments of the present disclosure are directed toward placing the emails into a sequential list with the email having the earliest promotional expiration date first and the email having the latest promotional expiration date last. For instance, a first email has a promotional expiration date of 06/15/14, a second email has a promotional expiration date of 06/30/14, and a third email has a promotional expiration date of 06/10/14. Therefore, the third email will be listed first, followed by the first email, and the second email will be listed last.

In certain embodiments, the system can be configured to receive preferences (e.g., from a user or from historical data) that can tailor the system and partially override the sequential listing of emails based on the expiration date of their promotion. For example, a user makes many purchases from Store A and would like promotions sent from Store A to remain at the top of a list regardless of expiration date and turn the text in the subject line of the email to red when a coupon is set to expire within a week. A first email from Store A has a promotional expiration date of 06/15/14, a second email from Store B has a promotional expiration date of 06/30/14, and a third promotional email from Store C has a promotional expiration date of 06/10/14. As a result, the first promotional email will be listed first, followed by the third email, and the second email will be listed last. Furthermore, in particular embodiments, the current calendar date can be checked. In this example, the calendar date is 06/09/14, which is within a week of the promotion expiring from Store A. Therefore, the text in the subject line of the email from Store A will be in red.

Consistent with embodiments, emails that have promotional expiration dates that have passed can be excluded from the list of emails. For instance, a first email has a promotional expiration date of 06/15/14, a second email has a promotional expiration date of 06/30/14, and a third email has a promotional expiration date of 06/10/14. In certain embodiments, the current calendar date can be checked and determined to be 06/12/14. Therefore, the first email is listed first, followed by the second email, and the third email is excluded. In some embodiments, the third email can be deleted and all data regarding the third email can be erased. In other embodiments, some or all of the data regarding the third email can be stored and used to tailor the system to align with the preferences of a user. For example, it can be determined whether the user participated in or used the promotion of the third email (e.g., by recording whether or not a link within the email was activated or by receiving usage data from the source of the promotional email). If the user did participate in the promotion, the system can partially override the sequential listing of the emails and keep emails similar to the third at the top or near the top of the list or create a separate list for emails similar to emails that had promotions the user participated in or used.

Certain embodiments are directed toward displaying a list of the emails according to the expiration date of their promotion. The list can be tailored to fit the preferences of a user or users of the system. For instance, the list can be configured in vertical sequence where the email that has the earliest expiration date is at the top of the list and the email with the latest expiration date is at the bottom. In another embodiment, the emails can be grouped according to emails with promotions that will expire within a week, emails with promotions that will expire within two weeks, emails with promotions that will expire within 3 weeks, and emails with promotions that will expire within a month. In particular embodiments, select emails can be colored, italicized, underlined, starred, highlighted in some visual or auditory fashion, or prioritized in some way above other emails in the list.

Figure 1:
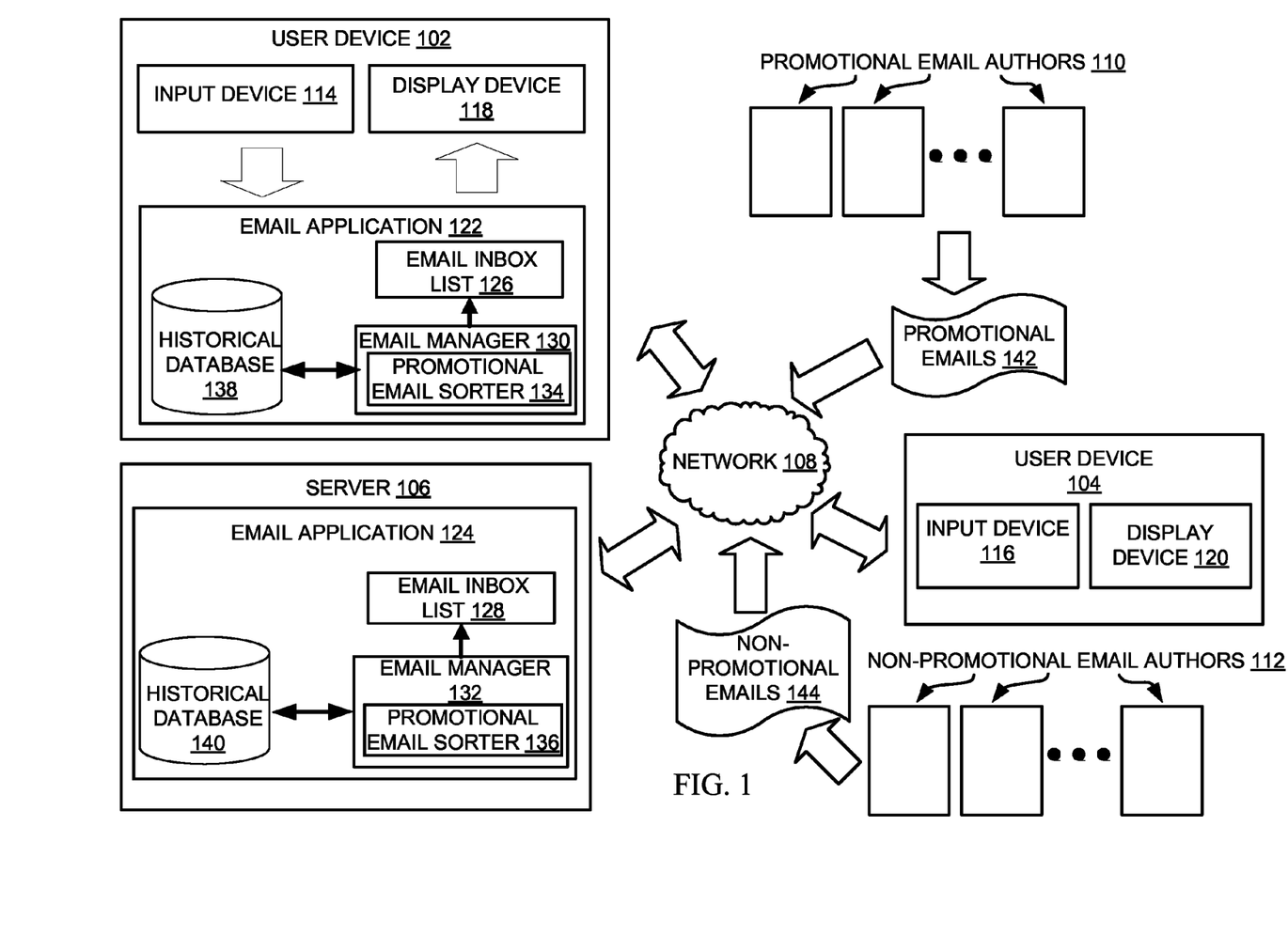
FIG. 1 depicts a block diagram of a system for sorting promotional emails, consistent with embodiments of the present disclosure.

Turning now to the figures, FIG. 1 depicts a block diagram of a system for sorting promotional emails, consistent with embodiments of the present disclosure. The system of FIG. 1 can be configured to sort emails located in email applications 122 and 124 for user devices 102 and 104. The user devices 102 and 104 can include, but are not necessarily limited to, personal computers, smart phones, and tablet devices. For example, the user device 102 can obtain emails over a network 108 and then display an email inbox list 126 using display device 118. The network 108 may include wide area networks (such as the Internet), local area networks that can include one or more servers, networks, or databases, and may use a particular communication protocol to transfer emails between the entities included in system.

According to certain embodiments, promotional emails 142 can be sent by promotional email authors 110 over the network 108 and received by the user device 102 and 106. Promotional emails 142 can have promotional expiration dates that are separate from dates about an email itself, such as when the email was sent by an author and when the email was received by a user. The promotional expiration dates can be located in the content of the email and can be located, more specifically, in the body of the content. When promotional emails 142 are received, the promotional email sorters 134 and 136, shown here located in the email applications 122 and 124, can sort the promotional emails 142 based on their promotional expiration dates.

Various embodiments allow the promotional email sorters 134 and 136 to parse the content of the promotional emails 142 to determine the promotional expiration dates. For instance, each email can have several dates located somewhere in the contents of the email. Some of these dates can have information about the promotional email itself and others can be in regard to the purpose or subject of the promotional email. Consistent with various embodiments, the promotional email sorters can identify the words around the dates located in the contents of the promotional email and retrieve contextual information about the dates. Using the contextual information, the promotional email sorters can understand how the dates are being used in the promotional email and determine if the date is a promotional expiration date.

Particular embodiments can be configured to allow email managers 130 and 132 to use the sorting function of the promotional email sorters and create the email inbox lists 126 and 128. In particular embodiments, the promotional email sorters 134 and 136 can be configured to sort the promotional emails 142 into sequential lists 126 and 128, where the email with the earliest promotional expiration date is at the beginning of the list and the email with the latest promotional expiration date is at the end of the list. The promotional email sorters can be further configured to exclude emails that have a promotional expiration date that has passed. In an embodiment, the promotional email sorters can be configured to check the current calendar date and exclude emails where the current calendar date is chronologically after the promotional expiration date. The lists 126 and 128 can then be displayed using the display devices 118 and 120.

According to embodiments, input devices 114 and 116 can allow a user to give feedback to the email applications 122 and 124 regarding the promotional expiration date sorting capability. The email managers 130 and 132 can store data obtained from the feedback in the historical databases 138 and 140 and retrieve the data to adjust the promotional email sorter 134 and 136 such that the email inbox lists 126 and 128 are tailored to more accurately fit the preferences of the user.

Furthermore, the email managers 130 and 132 can be capable of observing a user's response to promotional emails 142, obtaining data from these observations, storing the data in the historical databases 138 and 140, receiving similar promotional emails 142, and retrieving the data from the historical databases. The promotional email sorters can then be used to create email inbox lists 126 and 128 that are tailored and to more accurately fit the preferences of the user. For example, a user is a frequent shopper of Store A and therefore, provides feedback to the email application so that promotions from Store A are kept at the beginning of the email inbox list 126 until the promotion has ended. Also, when a new promotion comes in from Store A, the subject line of the email is highlighted and the user device 102 makes a bell chime sound to notify the user. Email manager 130 notices that Store B sells quite a few items that are similar to the items sold by Store A. As a result, email manager uses the promotional email sorter 134 to place the email at the beginning of the email inbox list, right after emails from Store A. Email manager then observes that the user deleted, removed, or excluded the email from Store B from the list. The email manager stores this information in the historical database 138 and when another email from Store B is received, the email manager will use the promotional email sorter to place the email in the list with respect to its promotional expiration date.

In particular embodiments, non-promotional email authors 112 can send non-promotional emails 144 using the network 108 and be received by the user device 102 and server 106. In certain embodiments, the email applications 122 and 124 can be configured to separate promotional emails 142 from non-promotional emails 144 into separate list. For instance, in this case, the separation is based on the authors of the emails where non-promotional emails sent by non-promotional email authors are placed in one list and promotional emails sent by promotional email authors are place in another. The email application can then be configured to use the promotional email sorter to sort the promotional emails. In another embodiment, the email authors 110 and 112 can be non-differentiable. The email applications 122 and 124 can then be configured to use the promotional email sorters 134 and 136 to separate the emails into promotional and non-promotional emails. In an embodiment the promotional email sorters can separate the promotional and non-promotional emails by parsing the content of each email for dates, examining the words surrounding the dates, receiving context information, and determining whether each email has a promotional email expiration date.

Figure 2:
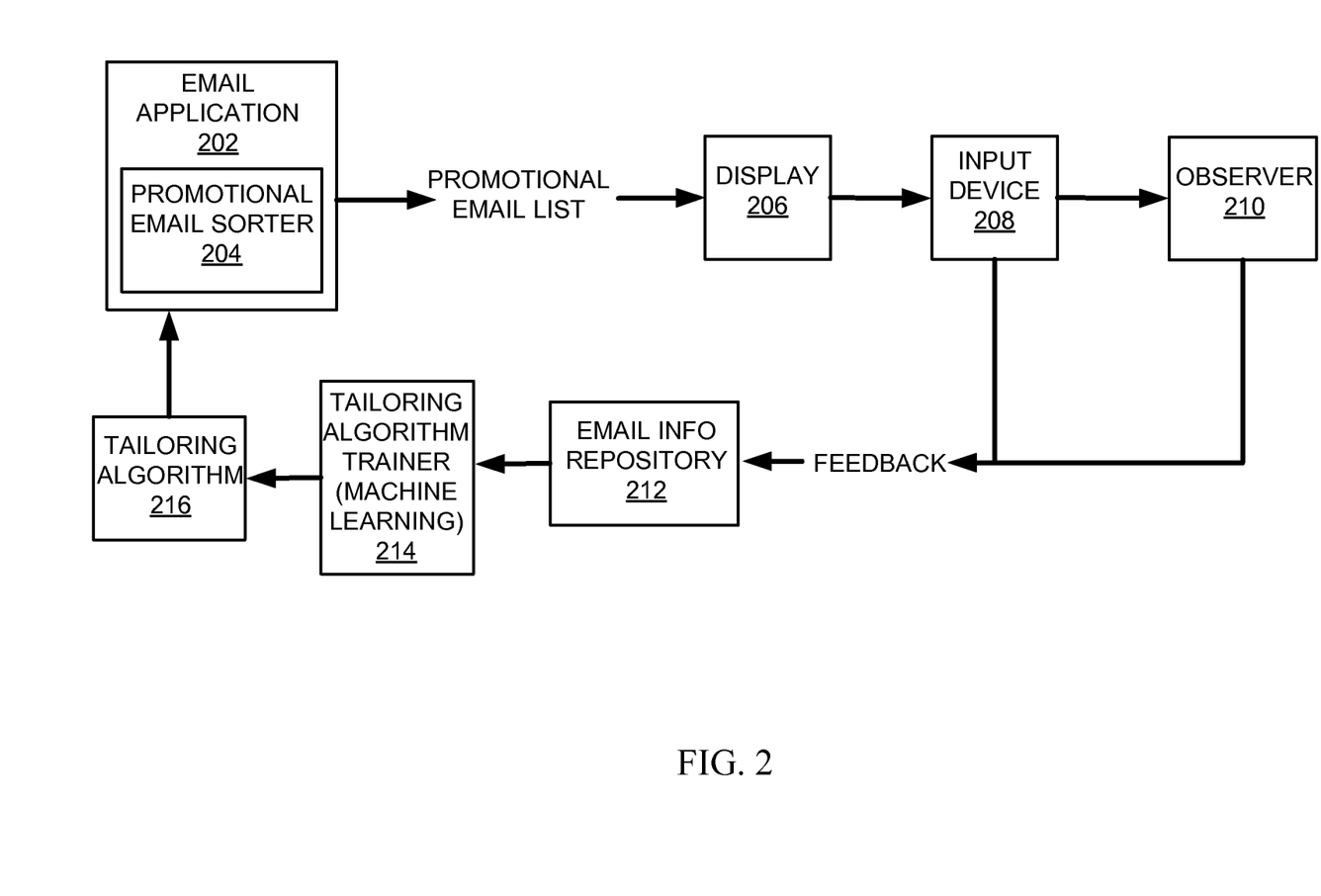
FIG. 2 depicts a flow diagram of a system for sorting and displaying promotional emails, consistent with embodiments of the present disclosure.

FIG. 2 depicts a flow diagram of a system for sorting and displaying promotional emails, consistent with embodiments of the present disclosure. Email application 202 can be configured to include promotional email sorter 204. Email application 202 can use the promotional email sorter 204 to sort promotional emails based on their promotional expiration dates and exclude promotional emails that have a promotional expiration dates that have passed. In certain embodiments, the emails can be sorted in a sequential list where the email with the earliest promotional expiration date is at the beginning of the list and the email with the latest promotional expiration date is at the end of the list.

According to embodiments, once the list has been sorted and the expired promotional emails have been excluded, a promotional email list can be provided to a display 206. The display 206 can be a visual display that performs as an output device for presentation of images transmitted electronically such that a user can view the promotional email list. In particular embodiments, an input device 208 can be used by a user to respond to the display of the promotional email list. The input device 208 can be an electronic device used to provide data and control signals to an information processing system (e.g., email application 202). Examples of input devices can include keyboards, a mouse, touchscreens and joysticks. The user can respond in many different ways to the display of the promotional email list. For instance, a user can use the input device 208 to exclude emails from the list, open emails, and click on links within the emails. Furthermore, a user can use the input device 208 to provide feedback so that the promotional email list can be tailored to the preferences of the user. The feedback can then be provided for storage in an email info repository or database 212. For example, the user may want promotional emails that are set to expire within a week to be highlighted or starred so that they can be distinguishable from promotional emails that are set to expire at a later time. The user can then adjust settings on an interface of the email application 202 that enable this capability and the settings can be saved in the email info repository 212.

Various embodiments can include an observer 210 that can be provided data from the input device 208. As stated, a user can directly provide feedback to tailor the promotional email list. In addition, the observer 210 can provide feedback based on the user's responses to the promotional email list. In certain embodiments, the observer 210 can be a module within the email application 202 that can monitor user activities (such as deleting emails) and provide data relating to the activities as part of the feedback. In various embodiments, the observer can be a separate application that monitors user activities, such as a web browser application that monitors accesses made to websites contained within the promotional emails. Various other types of observer functions can be used to generate feedback, along with combinations of the various types. For instance, a user may often open emails sent from certain authors and frequently click on links within those emails. Observer 210 can provide this as feedback to the email info repository 212 so that the promotional email list can be tailored to the preferences of the user. For example, a setting can be saved where emails sent from the authors can remain at the beginning of the promotional email list despite having promotional expiration dates later than emails sent from other authors.

In various embodiments, the feedback can be used by a tailoring algorithm trainer 214 to train settings used by a tailoring algorithm 216 based upon data from the email info repository 212. The trained settings can be used by the tailoring algorithm 216 to allow the email application 202 to generate a promotional email list that is tailored to the preferences of a user. The promotional email list can be once again be provided to the display 206 where the user can provide feedback using the input device 208 and the observer 210 can provide feedback. Therefore, the promotional email list can be dynamically altered over time.

Figure 3A:
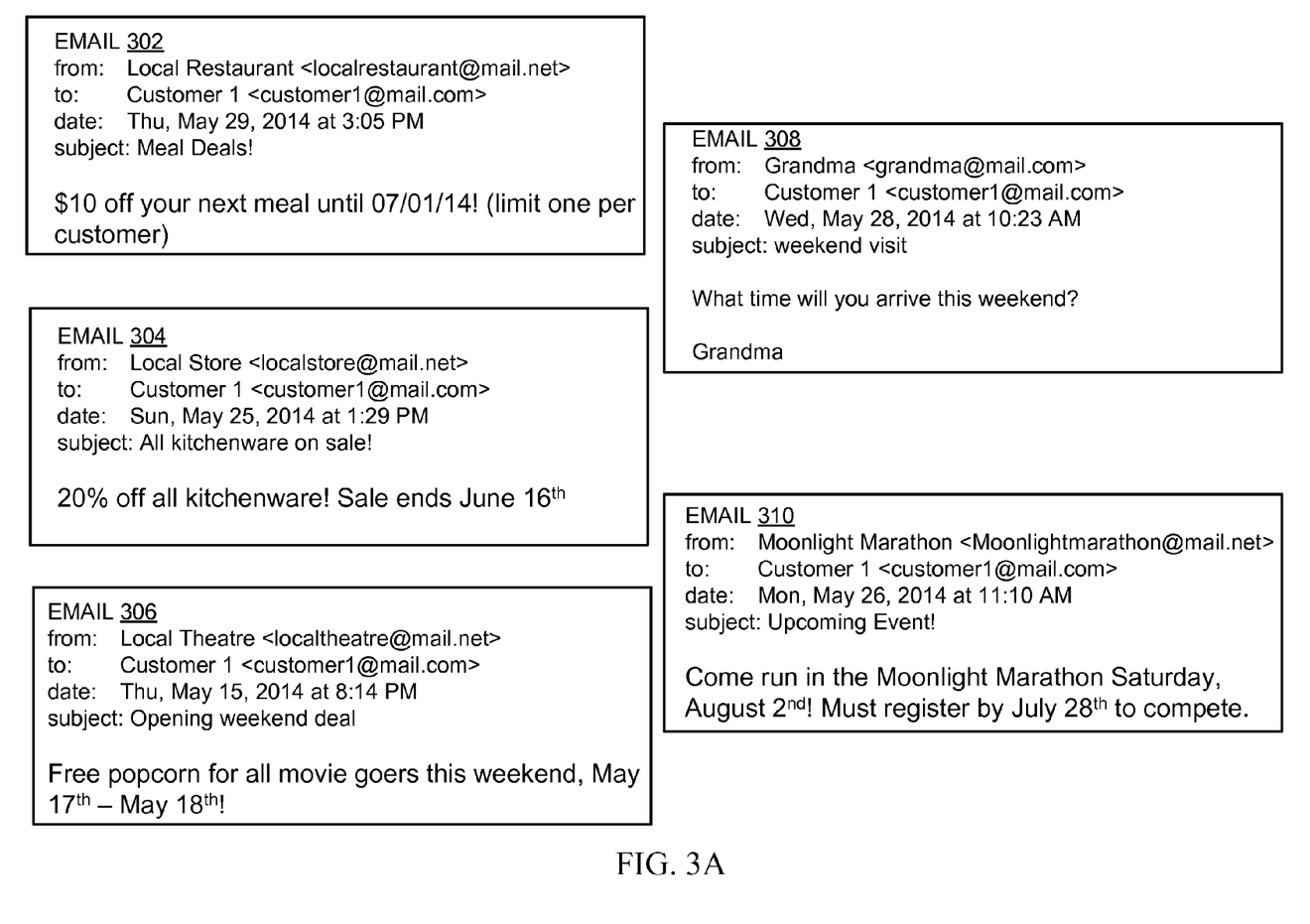
FIG. 3A depicts example emails for sorting, consistent with embodiments of the present disclosure.

FIG. 3A depicts example emails for sorting, consistent with embodiments of the present disclosure. Emails 302-310 are to represent how emails appear on a display (e.g., display device 118, from FIG. 1) when they are "open" and the content of emails 302-310 is visible to a user. As stated herein, the content can include a header and a body. In certain embodiments, the header can include who the email is from, who the email is sent to, the date the email was received, and the subject of the email. The body can include the purpose of the email and can be in many formats, such as plain text and HTML. HTML can enable the ability to use links and images, use emphasis such as underlines and italics, and change font styles.

According to particular embodiments, the contents of the emails 302-310 can be parsed and dates can be identified by a promotional email sorter (e.g., promotional email sorters 134 and 136, from FIG. 1). For example, the header and the body of email 302 can be parsed and dates "Thu, May 29, 2014 at 3:05 PM" and "07/01/14" can be identified. The words surrounding the dates can then be identified. In this instance, "date:" can be identified for the "Thu, May 29, 2014 at 3:05 PM" and "$10 off your next meal until" can be identified for the "07/01/14" date. The context of the dates can then be understood from the words surrounding the dates and it can be determined whether the date is a promotional expiration date. In this case, the word "date:" next to "Thu, May 29, 2014 at 3:05 PM" and the fact that it is located in the heading of email 302 suggests that the date is not a promotional expiration date. However, the words "$10 off your next meal until" preceding the date "07/01/14" suggests that this is a promotional expiration date and can be used to sort email 302.

Various embodiments can have emails that have promotional expiration dates that have passed or expired. The promotional email sorter can be configured to check the current calendar date and exclude emails where the current calendar date is chronologically after the promotional expiration date. For instance, email 306 has a promotion that ends May 18$^{th}$ and the current calendar date is May 30$^{th}$. Since May 30$^{th}$ is chronologically after May 18$^{th}$, the promotion is deemed to have expired and can be excluded.

In particular embodiments, emails can be received that are not promotional emails. The promotional email sorter can be configured to separate non-promotional emails from promotional emails. In an embodiment, the promotional email sorter can separate the emails by identifying an author of an email and determining whether the author is a promotional email author. For example, the promotional email sorter can identify that the author of email 308 is not a promotional email author and therefore, determine email 308 is not a promotional email. In another embodiment, the promotional email sorter can separate the emails by parsing the email and if a promotional expiration date is not identified it can be determined that the email is a non-promotional email. For example, email 308 does not have a promotional expiration date; therefore, the promotional email sorter can determine that email 308 is not a promotional email. However, the promotional email sorter can separate promotional emails from non-promotional emails using other methods.

Figure 3B:
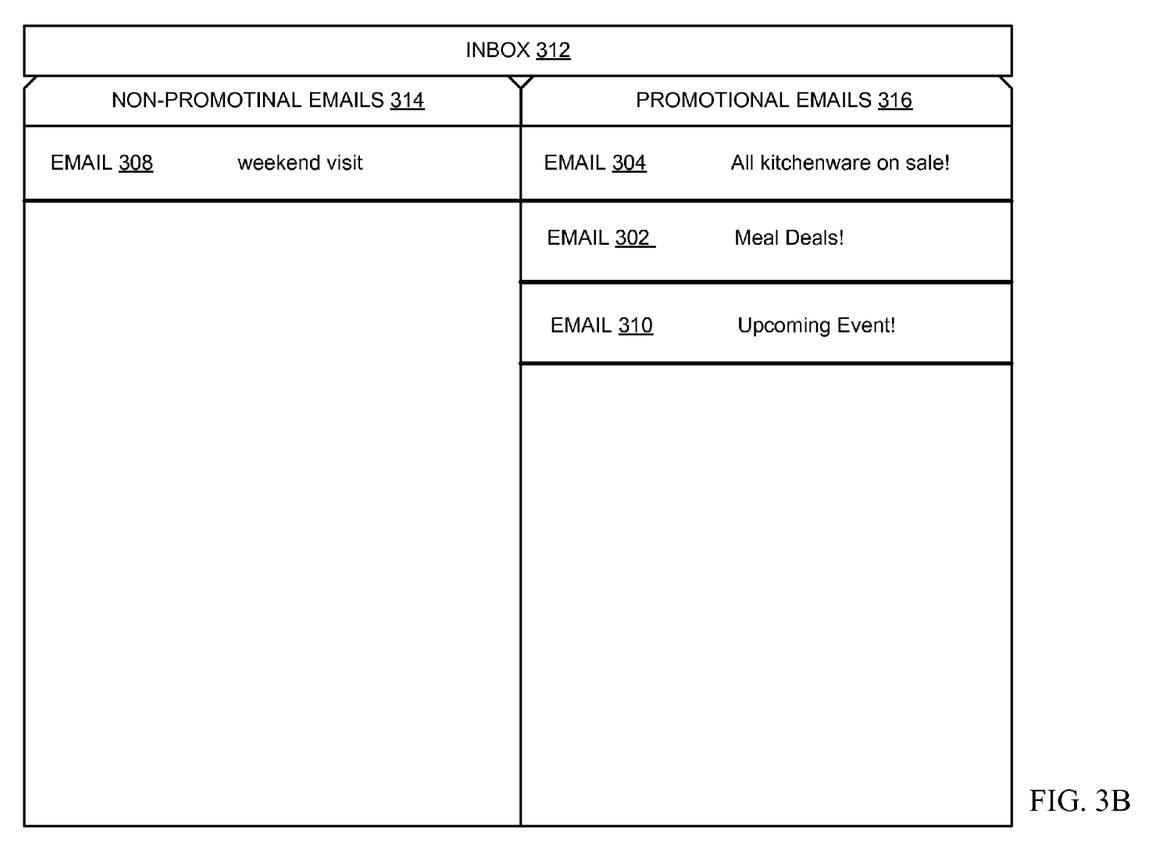
FIG. 3B depicts an example list of emails, consistent with embodiments of the present disclosure.

FIG. 3B depicts an example list of emails, consistent with embodiments of the present disclosure. In certain embodiments, as shown, inbox 312 can include a non-promotional email section 314 and a promotional email section 316. As stated herein, a promotional email sorter can separate emails in promotional emails and non-promotional emails. Further stated herein, email 308 has the criteria that would classify it as a non-promotional email and is located in the non-promotional email section 314. On the other hand, emails 302, 304, 306, and 310 have the criteria that would classify them as promotional emails. Therefore, in compliance with the settings of the promotional email sorter, the promotional email sorter is configured to list emails 302, 304, 310 in sequential order based on their promotional expiration dates. In this case, the list is located in the promotional email section 316 and the ordering begins at the top of the list and the end is located at the bottom. As a result, email 304 is listed first, followed by email 302, and lastly email 310. In addition, promotional email sorter is configured to exclude emails that have promotional expirations dates that have expired. Therefore, email 306 does not appear in either the non-promotional email section 314 or the promotional email section 316.

In various embodiments, the list produced can vary based upon feedback from a user and an email manager (e.g., email managers 130 and 132). For instance, the user may consider email 310 to not be a promotional email because it is an email about registering for a race, not an email for discounts. Therefore, the user may change the settings of the promotional email sorter to identify emails sent from the same author as the author of email 310 as non-promotional emails and set them in the non-promotional section 314. Other settings can also be altered to tailor the list to more accurately fit the preferences of the user.

Figure 4A:
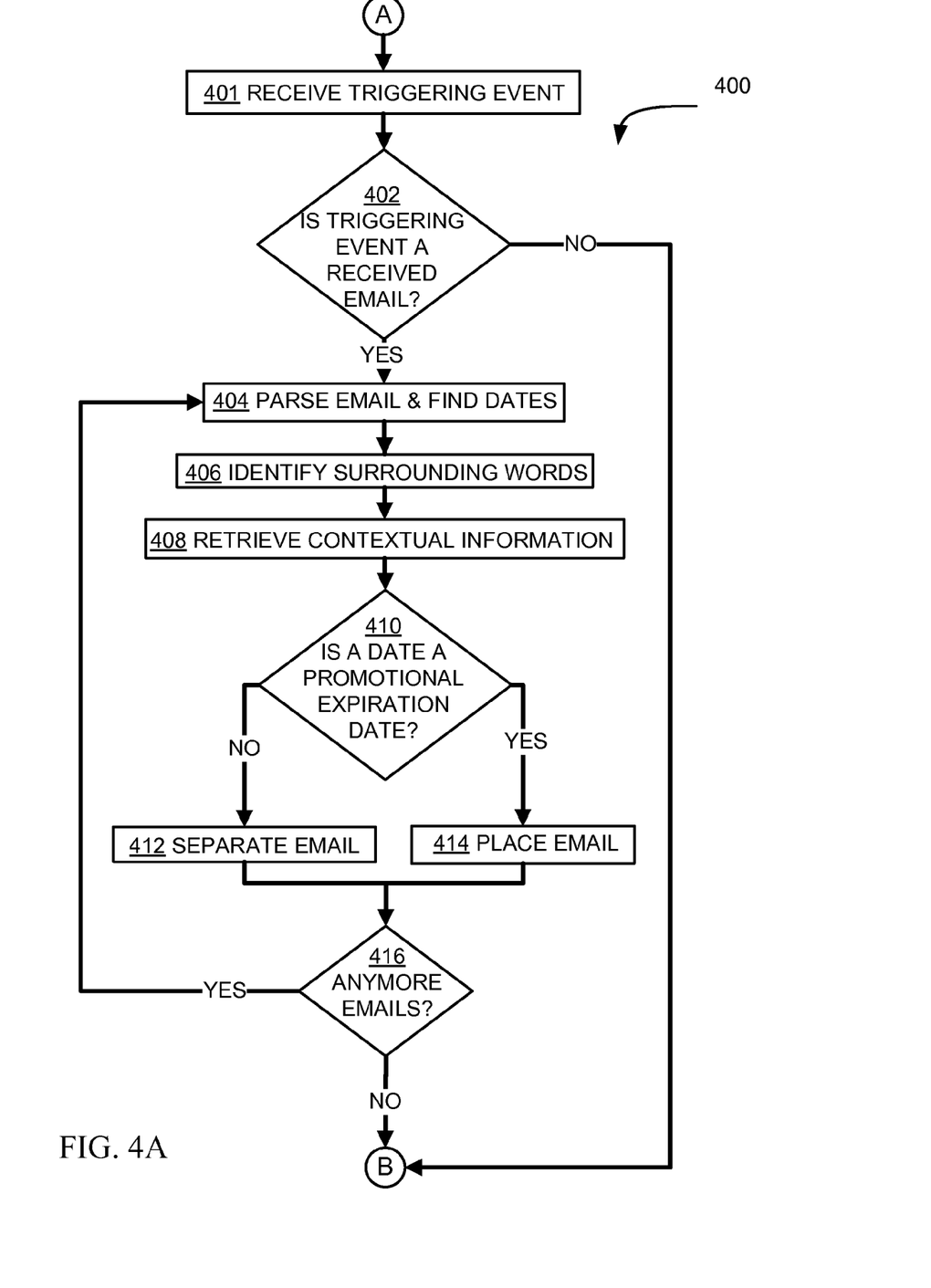
FIG. 4A depicts a method of sorting promotional emails, consistent with embodiments of the present disclosure.

FIG. 4A depicts a method 400 of sorting promotional emails, consistent with embodiments of the present disclosure. In operation 401, a trigger event is received. The trigger event can initiated the sorting process. Examples of triggering events can include receiving an email, refreshing an email application, signing into an email application, or removing or excluding an email. In operation 402, it is determined whether the triggering event is a received email. If the triggering event is not a received email, the current calendar date is checked in operation 418. If the triggering event is a received email the content of the email can be parsed to find dates in operation 404. The content can include a header and a body and both can be parsed to find the dates. In operation 406, words surrounding the dates can be identified. In operation 408, contextual information is retrieved based on the words identified surrounding the dates and in operation 410, it is determined whether any of the dates are a promotional expiration date. In an embodiment, if none of the dates in the email is a promotional expiration date, the email is considered a non-promotional email and is separated from the promotional emails in operation 412. In another embodiment, because the email does not have a promotional expiration date, the method may not be capable of sorting the email with the rest of the promotional emails and; therefore, the email may be separated from the promotional emails in operation 412. If the at least one date is determined to be a promotional expiration date, in operation 414, the promotional email can be placed into the corresponding list. In particular embodiments, the promotional email can be placed in chronological order with respect to its promotional expiration date with the rest of the promotional emails. In operation 416, it is determined whether there are any more emails. If there are more emails, the next email can be received in operation 404.

Figure 4B:
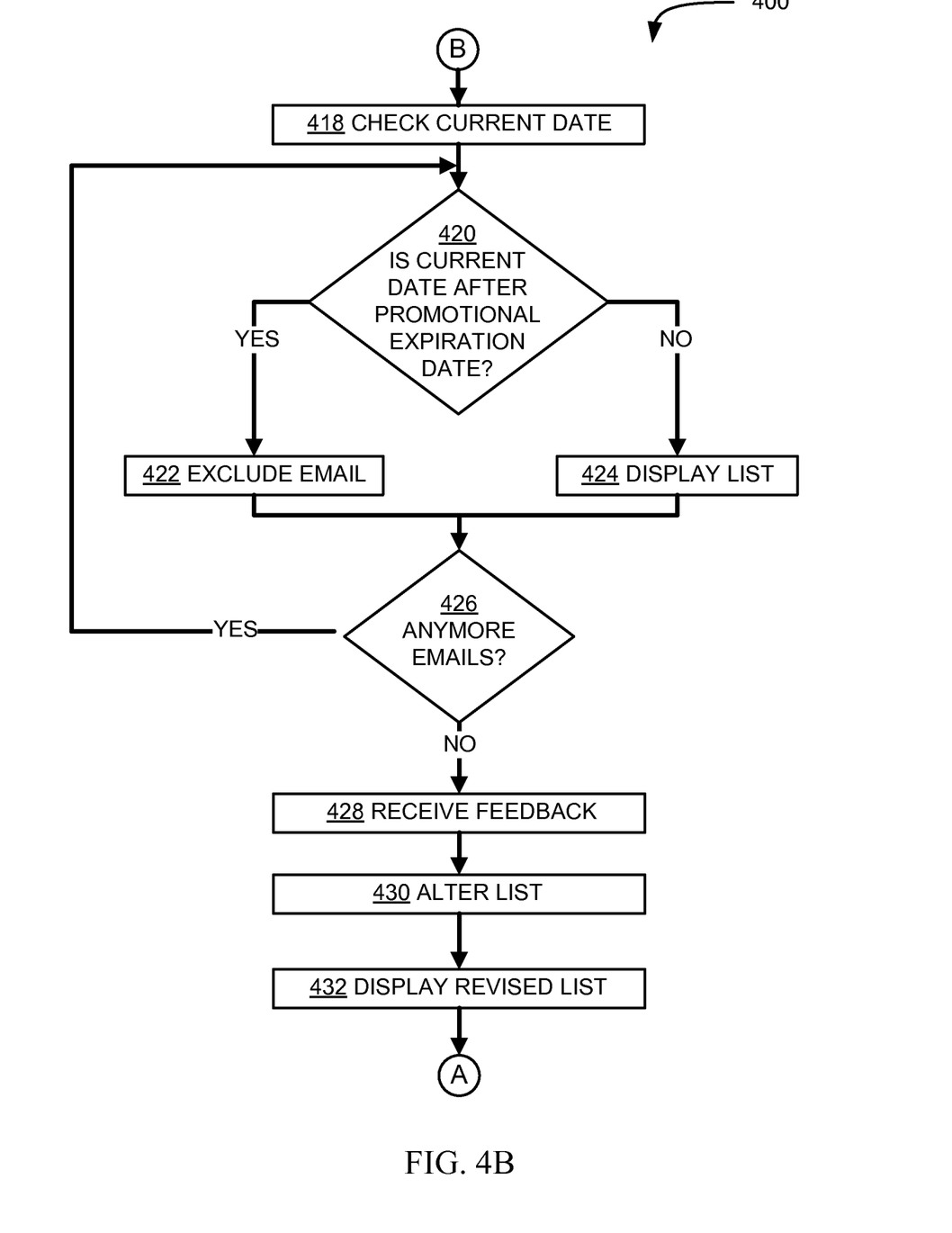
FIG. 4B depicts a continuation of a method of sorting promotional emails, consistent with embodiments of the present disclosure.

FIG. 4B depicts a continuation of method 400 from FIG. 4A of sorting promotional emails, consistent with embodiments of the present disclosure. In operation 418, the current calendar date can be checked. In operation 420 it is determined whether the current calendar date is after the promotional expiration date. For example, the promotional expiration date for an email can be 06/29/14 and the current calendar date is 06/30/14, which is after the promotional expiration date. If the current calendar date is after the promotional expiration date, in operation 422, the email is excluded from the promotional emails. If the current calendar date is not after the promotional expiration, in operation 424, the list of promotional emails is displayed. In operation 426 it is determined whether there are any more emails to check. If there is another email, in operation 420, the next email will be checked to see whether the current calendar date is after its promotional expiration date.

If there is not another email, in operation 428, feedback can be received based on the displayed list. For instance, the list can be displayed on a display device where a user can view the list. The user may decide they would like certain emails to remain at the beginning of the list despite their promotional expiration dates being later than other promotional emails. In operation 430, the feedback can alter settings for which determine how the list is ordered. For example, the feedback from the user wanting certain emails at the beginning of the list can alter the settings so that the promotional expiration date is overridden and the emails are placed at the beginning of list. In operation 432, the revised list can then be displayed, in this case, having the chosen emails at the beginning of the list.

In another embodiment, the responses of the user to the displayed list can observed by the system (e.g., email managers 130 and 132, from FIG. 1). The feedback, therefore, can be received from the system. In operation 430, the feedback can alter settings such as highlighting certain emails or the subject line of certain emails so that they can be more distinguishable from the rest of the emails. In operation 432 the list with certain emails highlighted can then be displayed.

In yet another embodiment, the system may observe that the user moved an email from the promotional email list to a non-promotional email list. In this case, the system can provide feedback that alters a setting where future emails sent from the author of that email will now be separated from the promotional emails. In operation 432 the list can be displayed absent emails sent from the author.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
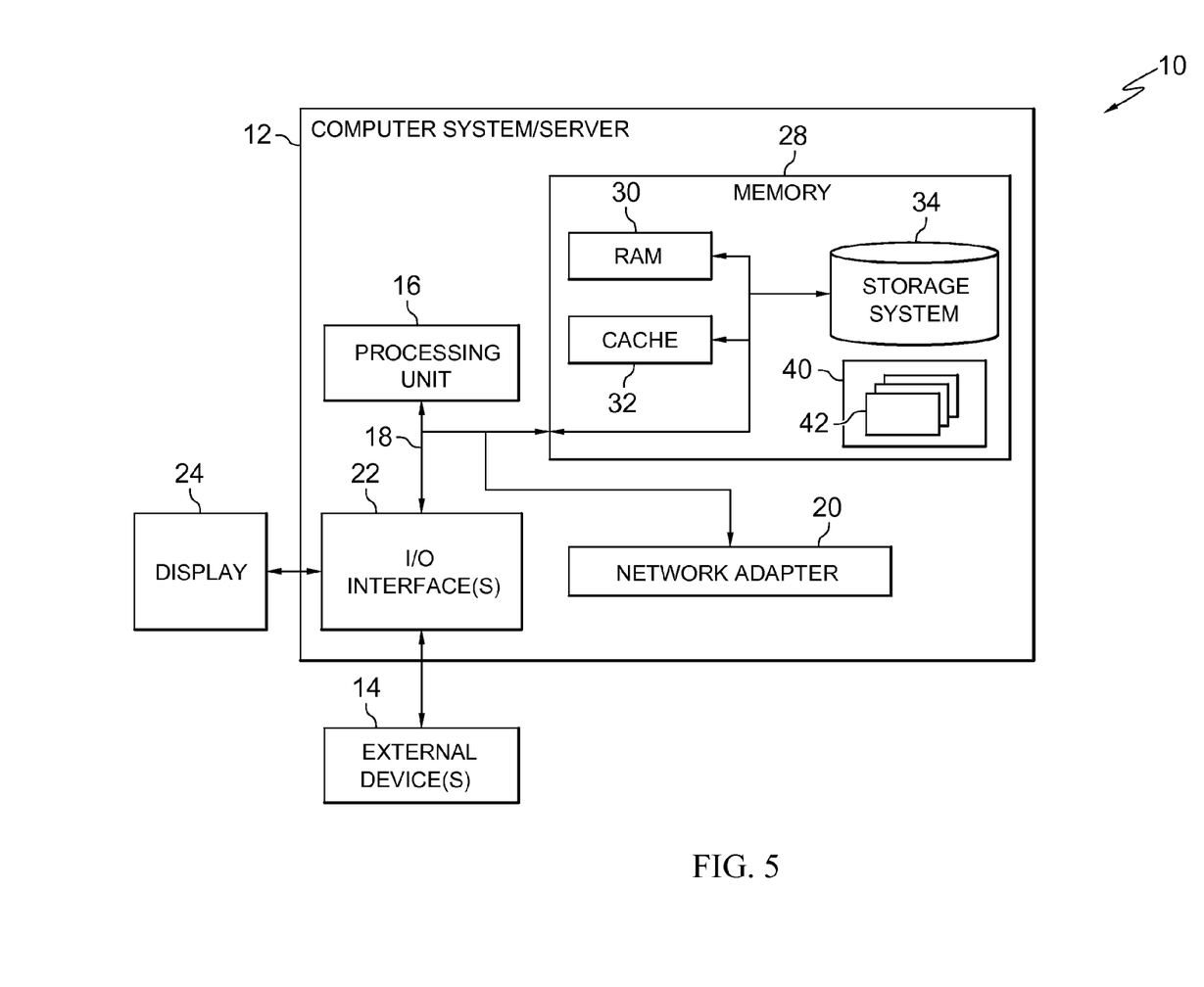
FIG. 5 depicts a cloud computing node, according to an embodiments of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
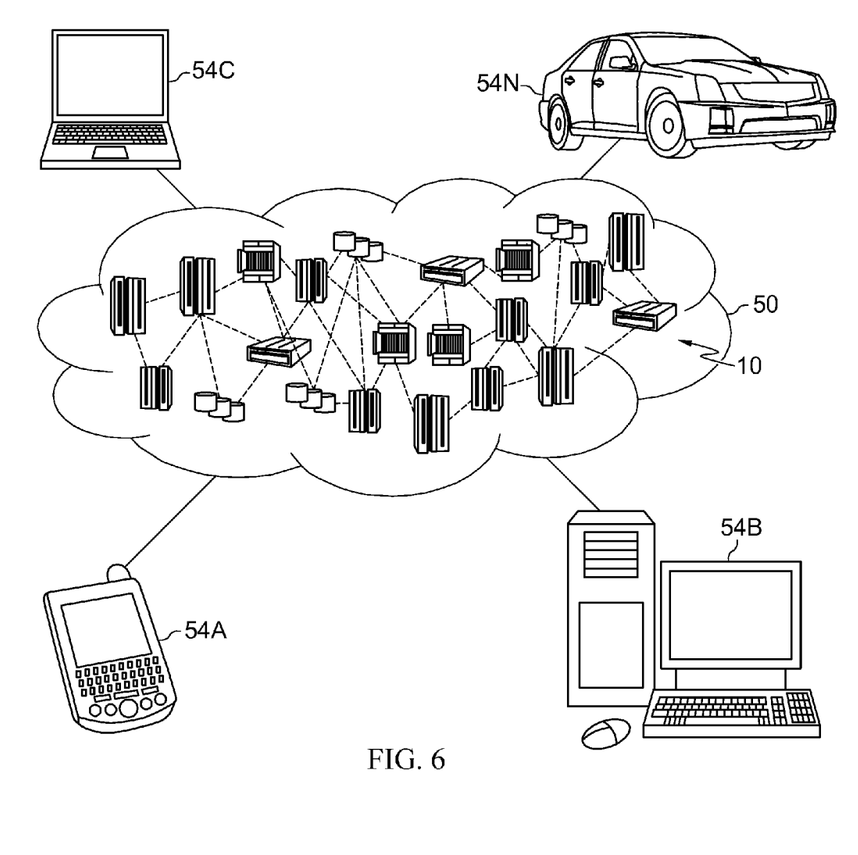
FIG. 6 depicts a cloud computing environment, according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
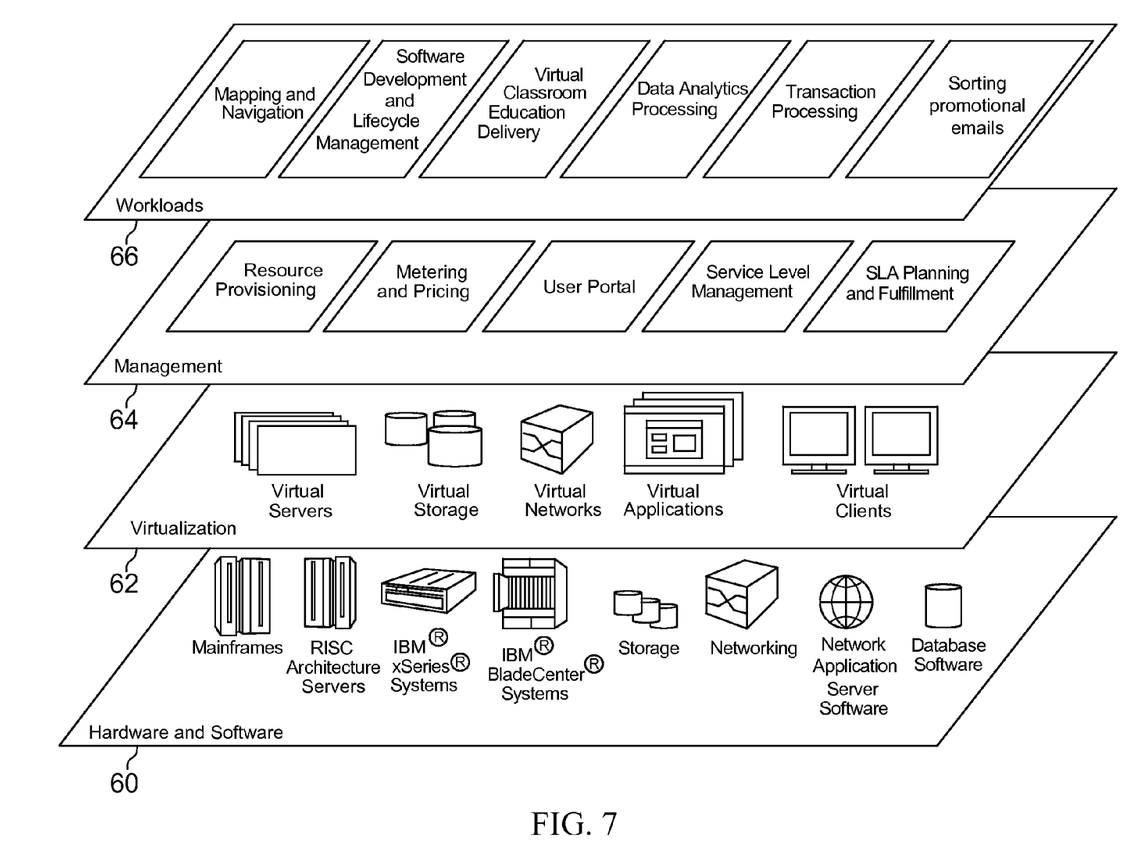
FIG. 7 depicts abstraction model layers, according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and sorting promotional emails.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of sorting promotional electronic mail (email) by a promotional email sorter, the method comprising:
receiving a set of emails;
identifying, in the body of a first email of the set of emails, a set of two or more dates;
parsing the body of the first email to identify a set of words associated with a first date in the set of two or more dates;
retrieving from a database, using the set of words, contextual information associating a context to at least the first date;
determining, that the first date is a promotional expiration date based on the contextual information;
determining, using a tailoring algorithm and the promotional expiration date, an order for placing the first email in a list of one or more promotional emails, wherein the tailoring algorithm is adapted to user preferences for ordering and displaying the list using machine learning and feedback information obtained from users and stored in a historical database;
placing the first email into the list according to the determined order;
checking a current calendar date;
excluding a second email from the list in response to the current calendar date being chronologically after the promotional expiration date; and
displaying the list based on the exclusion of the second email.

2. The method of claim 1, further comprising:
determining, based on the contextual information, that a subset of the set of emails does not include promotional expiration dates; and
placing the subset of the set of emails that do not have promotional expiration dates in a second list.

3. The method of claim 1, wherein the feedback information is from an email client application.

4. The method of claim 1, wherein the feedback information includes instructions for reordering the list based upon an author of one or more emails emails in the list.

5. The method of claim 1, wherein the feedback information includes instructions for reordering the list based upon a type of promotion.

6. The method of claim 1, wherein the feedback information highlights at least one email in the list based upon an author of one or more emails from the subset of the set of emails.

7. The method of claim 1, wherein the feedback information includes instructions to exclude at least one email from the list based upon an author of one or more emails in the list.

8. A system of sorting promotional electronic mail (email), the system comprising:
   a hardware processor;
   a promotional email sorter executing on the hardware processor to:
      receive a set of emails;
      identify, in the body of a first email of the set of emails, a set of two or more dates;
      parse the body of the first email to identify a set of words associated with a first date in the set of two or more dates;
      retrieve from a database, using the set of words, contextual information associating a context to at least the first date;
      determine, that the first date is a promotional expiration date based on the contextual information;
      determine, using a tailoring algorithm and the promotional expiration date, an order for placing the first email in a list of one or more promotional emails, wherein the tailoring algorithm is adapted to user preferences for ordering and displaying the list using machine learning and feedback information obtained from users and stored in a historical database;
      place the first email into the list according to the determined order;
      check a current calendar date;
      exclude a second email from the list in response to the current calendar date being chronologically after the promotional expiration date; and
   a display device configured to displaying the list based on the exclusion of the second email.

9. The system of claim 8, wherein feedback information is from an email client application.

10. The system of claim 8, further comprising:
   an email client application configured to provide the feedback information to reorder the list based upon an author of one or more of the emails in the list.

11. The system of claim 8, further comprising:
   an email client application configured to provide the feedback information to reorder the list based based upon a type of promotion.

12. The system of claim 8, further comprising:
   an email client application configured to provide the feedback information to highlight at least one email in the list based upon a type of promotion.

13. The system of claim 8, further comprising:
   an email client application configured to provide feedback to remove at least one email from the list based upon a type of promotion.

14. A computer program product configured to sort promotional electronic mail (email), the computer program product comprising a computer readable storage medium, having program code embodied therewith, wherein the computer readable storage medium is not a transitory signal per se the program code comprising computer readable program code configured to:
   receive a set of emails;
   identify, in the body of a first email of the set of emails, a set of two or more dates;
   parse the body of the first email to identify a set of words associated with a first date in the set of two or more dates;
   retrieve from a database, using the set of words, contextual information associating a context to at least the first date;
   determine, that the first date is a promotional expiration date based on the contextual information;
   determine, using a tailoring algorithm and the promotional expiration date, an order for placing the first email in a list of one or more promotional emails, wherein the tailoring algorithm is adapted to user preferences for ordering and displaying the list using machine learning and feedback information obtained from users and stored in a historical database;
   place the first email into the list according to the determined order;
   check a current calendar date;
   exclude a second email from the list in response to the current calendar date being chronologically after the promotional expiration date; and
   display the list based on the exclusion of the second email.

15. The computer program product of claim 14, wherein the feedback information is from an email client application.

16. The computer program product of claim 14, wherein the feedback information includes instructions for reordering the list based upon an author of one or more emails in the list.

17. The computer program product of claim 14, wherein the feedback information includes instructions for reordering the list based upon a type of promotion.

18. The computer program product of claim 14, wherein the feedback information highlights at least one email in the list based upon an author of one or more emails in the list.

* * * * *